2,822,247

PROCESS FOR THE SYNTHESIS OF MANGANESE CARBONYL

Vincent Hnizda, Huntington Woods, Mich., assignor to Ethyl Corporation, New York, N. Y., a corporation of Delaware No Drawing. Application June 21, 1956
Serial No. 592,713

5 Claims. (Cl. 23—203)

This invention relates to a novel process for the synthesis of manganese carbonyl.

Until the past few years the compound, manganese carbonyl, was not known to exist. A recent publication describes a process involving the reduction of manganese iodide with a Grignard reagent under pressure of carbon monoxide. This process yielded a mixture of products in which the presence of manganese was indicated by peaks observed upon mass spectrometric analysis. However, no apparent peak was observed for the compound corresponding to $Mn_2(CO)_{10}$, which is believed to be the formula of manganese carbonyl, so that the presence of this compound in the product was not established. Further characterization of the product could not be carried out because of the minute quantity obtained by the above mentioned reaction. More recently, other investigators have prepared manganese carbonyl by reducing manganese iodide with magnesium metal under pressure of carbon monoxide. The reported yield, however, is very low, only about 1% of the theoretical value. To date, no practical method has been reported for the synthesis of manganese carbonyl in good yield.

It is, therefore, an object of this invention to provide a method for the synthesis of manganese carbonyl. It is a further object of the present invention to provide a method for the synthesis of manganese carbonyl in better yield. It is also an object of this invention to provide a method for the synthesis of manganese carbonyl which will reduce the amount of undesired components in the reaction product. Other objects of my invention will become apparent from the description which follows.

It has now been found that manganese carbonyl can be synthesized by the reduction of manganous chloride with an aryl magnesium halide reagent under a pressure of carbon monoxide. It has also been found that a purer product is obtained by employing a Grignard reagent synthesized from an aryl chloride rather than an aryl bromide, or from a mixture of aryl chloride and an aryl bromide. Furthermore, the higher the percentage of the aryl magnesium chloride in the mixture, the smaller the amount of impurities due to side reactions in the product.

The present invention possesses the advantage of greatly increased yield over prior art methods of synthesizing manganese carbonyl. This is evidenced by the fact that whereas methods previously employed resulted in yields of practically 0 to about 1%, yields of 8 or 9% or multiples of the last figure can easily be obtained by the present invention. Another advantage that the present process possesses is that the product can be obtained in purer form, that is, with fewer contaminants due to side reactions, by employing the appropriate Grignard reagent or mixture of Grignard reagents. Not to be overlooked, is the lower cost of manganous chloride which is used in the reaction as compared to manganous iodide which has been used heretofore in the previously attempted synthesis.

According to the present invention manganese carbonyl can be prepared by reacting manganous chloride with an aryl Grignard such as phenyl magnesium bromide or phenyl magnesium chloride, or a mixture of the two under a pressure of carbon monoxide. The manganese carbonyl can be separated from the product mixture by conventional methods such as fractional distillation, sublimation, and steam distillation. The method of synthesis will become more apparent from the examples which follow.

Example 1

To a pressure resistant vessel equipped with a temperature measuring device, gas inlet and outlet means, means for agitation, cooling and heating means, and means for adding reagents under pressure, was added 24 parts of phenyl magnesium bromide in 20 parts of ether. Following this the vessel and the Grignard solution were cooled to about —50° C. and 7.6 parts of finely powdered anhydrous manganous chloride were added. The reaction vessel was then closed and flushed twice with nitrogen gas at a pressure of 300 p. s. i. g. and twice with carbon monoxide at a pressure of 300 p. s. i. g. Carbon monoxide was next admitted at a pressure of 1000 p. s. i. g. to the reaction vessel, the contents of which were at a temperature of —14° C. As the temperature slowly rose to 0° C. the pressure of carbon monoxide was increased to 2000 p. s. i. g. while keeping the reactants in constant agitation. The reaction vessel and contents were slowly allowed to warm up to 27° C. and permitted to remain at this temperature for about 12 hours. Following this, heat was slowly applied raising the temperature to 60° C. and then the vessel was allowed to cool again. Constant agitation was maintained throughout the reaction period. As the carbon monoxide was absorbed, more was periodically admitted to keep the pressure between 2100 and 2200 p. s. i. g. The greater part of the CO that was taken up, appeared to be absorbed during approximately the first four hours, in which period the reaction mass varied in temperature from —14° C. to 27° C. After a total of 38.5 hours the excess carbon monoxide was slowly released from the reaction vessel bringing the pressure down to atmospheric. The reaction product consisted of an ether layer and a precipitated-solids layer. The ether layer was separated and the ether distilled off leaving a quantity of impure manganese carbonyl as a thick yellow substance. The precipitated-solids layer was hydrolyzed with ice water and then steam distilled and a quantity of yellow crystalline material collected in the distillate. The residue from the steam distillation was then acidified with dilute hydrocholric acid and further subjected to steam distillation to obtain an additional amount of yellow product.

The product was purified by first dissolving out the impurities with cold ether and then subjecting the solid to sublimation under reduced pressure to produce yellow crystals, which were recrystallized from ether to yield golden yellow crystals melting at 156.5° C. The manganese carbonyl product analyzed 28.2% manganese and 30.9% carbon (calculated, 28.17% manganese and 30.80% carbon corresponding to the formula
$Mn_2(CO)_{10}$)
The yield of product was 5% by weight based on the amount of manganous chloride charged to the reaction vessel.

Example II

The procedure of Example I was repeated employing 217 parts of phenyl magnesium bromide in 183 parts of ether and 75.6 parts of maganous chloride. Carbon monoxide was admitted to the vessel at —17° C. at a pressure of 400 p. s. i. g. Then, as the temperature of the reaction mixture went up over a period of an hour to 16° C., the pressure was increased to 1925 p. s. i. g. at −51° C. and to 2175 at 16° C. The temperature was not allowed to exceed 30° C. and after 24 hours the excess carbon monoxide was vented and the reaction mixture treated as described in Example I and 9.96 parts (8.5% yield) of manganese carbonyl was collected.

When the process of this example is repeated using a substituted aryl magnesium halide such as tolyl magnesium bromide, in place of phenyl magnesium bromide, equally good results are obtained. Good results are also obtained when naphthyl magnesium bromide is used instead of phenyl magnesium bromide.

*Example III*

The procedure of Example I was repeated using 336 parts of phenyl magnesium bromide in 281 parts of ether and 75.6 parts of finely powdered manganous chloride. The reaction vessel was pressurized to 1700 p. s. i. g. with carbon monoxide at −13° C. and to 2100 p. s. i. g. at −11° C. The highest temperature that the reaction mixture was allowed to attain was 32° C. over a period of about 27 hours. After venting the excess carbon monoxide and purifying the product, 10.8 parts of manganese carbonyl (9.2% yield) was obtained.

In this, as well as in all the other examples, more carbon monoxide was admitted to the reaction vessel periodically to replace that which had been consumed in the reaction or loss due to leakage.

*Example IV*

The procedure of Example I was followed using a mixture of 50 weight percent phenyl magnesium bromide and 50 weight percent phenyl magnesium chloride (total 190 parts), in 142 parts of ether and 76 parts of manganous chloride. Carbon monoxide was introduced at a pressure of 800 p. s. i. g. at −32° C. As the temperature of the reaction mixture increased to −11° C. the pressure of CO was increased to 2040 p. s. i. g. The temperature was allowed to slowly increase to 25° C. over a period of 3.5 hours. After 19 hours the temperature was slowly raised to 68° C. and then lowered again. Additional carbon monoxide was introduced periodically to bring the pressure in the vessel up to about 2235 p. s. i. g. After a total of 43 hours the excess CO was vented and the product separated as described in Example I. A yield of 10.4 parts (8.75%) of manganese carbonyl was obtained.

It was found that when a mixture of phenyl magnesium bromide and phenyl magnesium chloride is used as the Grignard reagent as in the run just described, the product on opening the reaction vessel is higher in manganese carbonyl concentration. In addition, it was also found that the purification was effected more easily, that is, the steam distillation yielded a product higher in manganese carbonyl concentration and the sublimation was effected more easily with a smaller proportion of undesired impurities such as biphenyl and the like being present. This indicates that the use of phenyl magnesium chloride as the Grignard reagent acts to produce a reaction product which contains a higher percentage of the desired manganese carbonyl and smaller amounts of contaminants which are apparently due to undesired side reactions.

*Example V*

In this example a 50–50 mixture of phenyl magnesium chloride (311 parts in 257 parts of ether) was employed together with 76 parts of manganous chloride. The procedure was the same as in the previous examples except that after 17 hours the temperature was slowly raised to 77° C. and then lowered again. After a total period of 41 hours during which time the highest pressure of carbon monoxide admitted to the reaction vessel was 2035 p. s. i. g., the excess CO was vented and the product purified to yield approximately 7.5% of manganese carbonyl based on the amount of manganous chloride used in the reaction.

*Example VI*

In this example a mixture of 20% by weight of phenyl magnesium bromide and 80% by weight of phenyl magnesium chloride (232 parts in 180 parts ether) was employed together with 76 parts of manganous chloride. Carbon monoxide was admitted to the vessel under pressure when the contents were at a temperature of −51° C. The carbon monoxide pressure was increased to 1960 p. s. i. g. by the time the contents had warmed up to −42° C. The absorption of carbon monoxide was observed when the contents in the reaction vessel were in the range of −51° C. to 10° C. After 18 hours the temperature was slowly increased to 71° C. and then cooled again to 17° C. The contents were removed after 26 hours and, on purification, 8.78 parts (7.5% yield) of manganese carbonyl were obtained.

*Example VII*

The procedure of Example VI is repeated except that carbon monoxide is admitted to the reaction vessel at a pressure of 4000 p. s. i. g. when the contents of the vessel are at a temperature of −32° C. Additional CO is added from time to time in order to keep the pressure at about 4000 p. s. i. g. After allowing the contents of the reaction vessel to be agitated for a period of several hours, the excess carbon monoxide is slowly vented and the product separated to yield a higher percentage of manganese carbonyl than was obtained in the previous example.

*Example VIII*

The process as described in Example I is repeated using as Grignard reagent phenyl magnesium chloride with only a trace of phenyl magnesium bromide. Carbon monoxide is admitted to the reaction vessel at a pressure of 8000 p. s. i. g. while the contents are below −10° C. After allowing the mixture to react under agitation for a period of several hours the contents are removed and separated to yield a high percentage of manganese carbonyl.

*Example IX*

The process of Example VIII is repeated except that the pressure of carbon monoxide in this case is increased to 10,000 p. s. i. g. Upon separation, a high yield of manganese carbonyl is obtained.

*Example X*

To the reaction vessel described in Example I was added 25 parts of powdered anhydrous manganous chloride and 182 parts of diethyl ether. The reaction vessel was then closed, cooled to below −50° C., flushed with nitrogen, followed by flushing with carbon monoxide and then pressurized to 500 p. s. i. g. with CO. The temperature of the reaction vessel and contents at this point was 13° C. Next, there was added 81 parts of phenyl magnesium bromide in approximately 71 parts of diethyl ether with the aid of pressure exerted by nitrogen. During the process of addition of the Grignard reagent, some nitrogen gas was also admitted to the reaction chamber raising the total pressure within the reaction vessel to 600 p. s. i. g. The time of addition was approximately 5 minutes during which period the temperature rose from 13 to 16° C. The temperature of the reaction mixture was slowly raised to 102° C. over a period of 26 hours after which the contents were allowed to cool to 23° C. The pressure in the reaction vessel was allowed to drop as low as 470 p. s. i. g., of which pressure approximately one-sixth was due to nitrogen. An amount of carbon monoxide equivalent to a pressure drop of 210 p. s. i. g. was used up, the greatest proportion of which was taken up during approximately the first five hours of the run. Constant agitation of the reaction mass was maintained during the reaction period. The contents of the reaction vessel were removed after a total of 44 hours and the product separated to yield about 2.5% manganese carbonyl.

This example shows that manganese carbonyl can be formed by the process of the present invention at relatively low pressures, below 393 p. s. i. g. partial pressure of CO as illustrated in this example. It is, therefore, evident that the reaction takes place even at very low partial pressures of carbon monoxide, that is, the process of the present invention can be utilized to prepare manganese carbonyl at pressures of CO below atmospheric.

The foregoing examples illustrate that the process of this invention can be carried out over a wide range of temperatures. For instance, in Example VI the absorption of carbon monoxide was noted at —51° C. and in other examples the take-up of carbon monoxide was observed at temperatures as high as 102° C. Thus, the temperature range in which the present process can be carried out is from about —70° C. to about 200° C. A preferred temperature range, during which the greater rate of absorption of carbon monoxide is observed is from —30° C. to about 50° C. An especially preferred range of temperatures from a practical standpoint with respect to cooling and heating of the reaction vessel and its contents is from about —20° C. to about 30° C.

From the examples it is also noted that carbon monoxide is absorbed at various partial pressures so that the process of my invention may be carried out with partial pressures of CO ranging from below atmospheric to about 100,000 p. s. i. g. However, taking into consideration the construction of the reaction vessel and other equipment, a practical range in which to conduct this process is at pressures of carbon monoxide of from about 1000 to about 20,000 p. s. i. g., which constitutes an especially preferred range of pressures.

It was also noted, when making the various runs described in the above examples, that carbon monoxide was absorbed by the reactants in the process of forming manganese carbonyl as soon as it was admitted to the reaction vessel. Absorption continued for many hours, so that the length of time that the reactants should be allowed to remain in contact with one another depends on the degree of completeness of reaction desired and the time economics involved. As illustrated by the examples, the reaction was allowed to proceed in some cases for 43 or more hours. However, it was observed that the greater portion of the carbon monoxide that reacted was consumed during the initital portion of the period. Therefore, a time of reaction of about 10 hours or less might be considered sufficient.

In each of the runs described in the examples above the contents of the reaction vessel were continuously agitated. This agitation may be accomplished by a variety of methods known to those skilled in the art as, for example, stirring, or including a piece of stainless steel in the reaction vessel and rocking the vessel during the reaction period, and the like.

Various solvents and diluents compatible with the reactants may be used such as ether, tetrahydrofuran, dioxane, benzene, inert glycol ethers, inert hydrocarbons, nitrogen, argon, and the like as well as mixtures of various such solvents and/or diluents.

The manganous chloride used in this process should be anhydrous since any water present destroys an equivalent amount of Grignard reagent. It was also found preferable that the manganous chloride be finely divided in order to expose the maximum surface area for reaction. However, the size of the particles is not critical so that even granular manganous chloride may be employed. Another requisite of the manganous chloride is that it should be oxygen free in order that higher yields may be obtained.

One variant of the instant invention is to use manganous bromide in place of manganous chloride as one of the reactants. It is found that while this method also produces manganese carbonyl, the yields are lower.

For the same reason that the manganous chloride should be free of oxygen and water, the carbon monoxide used in the reaction should also be free of oxygen since the presence of water or oxygen in the system tends to reduce the amount of product formed.

Another variant in the present process is to remove the excess aryl bromide and/or aryl chloride from the Grignard reagent solution before it is used. This has the effect of lowering the amount of biphenyl and other impurities formed during the reaction, thus permitting a cleaner and less bulky product mixture from which the manganese carbonyl can be more readily separated. To this end it is desirable to prepare the Grignard reagent so that it contains a minimum of unreacted phenyl halides.

In the examples, it is taught that different aryl magnesium halides may be used as the Grignard reagent. For example, the aryl portion may be mono or poly nuclear such as phenyl, naphthyl, anthryl, etc. The aryl portions may also have substituents thereon as in the case of tolyl, ethylphenyl, propylnaphthyl and the like. The halide portion of the reagent may be bromide, chloride or iodide and as shown above, the chloride or a mixture of bromide and chloride derivative of the Grignard reagent produces a purer product than does an aryl magnesium bromide.

The manganese carbonyl produced by the process of the present invention has a variety of uses. One of the uses of manganese carbonyl is as an antiknock agent and for such use it is employed in hydrocarbon fuels of the gasoline boiling range which are used in spark ignition internal combustion engines. Manganese carbonyl can also be used as a chemical intermediate in the synthesis of other compounds. This compound also provides a source highly purified and active manganese metal which may be obtained by the decomposition of manganese carbonyl.

Having fully described the nature of the present invention, it is not intended that it be limited except within the spirit and scope of the appended claims.

I claim:

1. A process for the synthesis of manganese carbonyl which comprises reacting manganous chloride with an aryl magnesium halide and carbon monoxide wherein the carbon monoxide pressure is at least about 393 p. s. i. g. and the temperature ranges from about —70° C. to about 200° C.

2. A process for the synthesis of manganese carbonyl which comprises reacting manganous chloride with phenyl magnesium chloride and carbon monoxide wherein the carbon monoxide pressure is at least about 393 p. s. i. g. and the temperature is below about 50° C.

3. The process of synthesizing manganese carbonyl which comprises reacting manganous chloride with a mixture of phenyl magnesium chloride and phenyl magnesium bromide, and with carbon monoxide wherein the carbon monoxide pressure is at least about 393 p. s. i. g. and the temperature is below about 50° C.

4. The process of claim 1 wherein the carbon monoxide pressure is up to about 3000 p. s. i. g. and the temperature is below 50° C.

5. The process of claim 2 wherein the carbon monoxide pressure is up to about 3000 p. s. i. g.

References Cited in the file of this patent

Brimm et al.: "Preparation and Properties of Manganese Carbonyl," J. Am. Chem. Soc. 76 (3831–5), July 20, 1954.

"Manganese Carbonyl," J. Am. Chem. Soc. 71 (1899), May 1949.